US011975996B2

United States Patent
Fujino

(10) Patent No.: US 11,975,996 B2
(45) Date of Patent: May 7, 2024

(54) COMPOSITION FOR INORGANIC MOLDED ARTICLE PRODUCTION USE, AND METHOD FOR PRODUCING INORGANIC MOLDED ARTICLE

(71) Applicant: KYUSHU UNIVERSITY, NATIONAL UNIVERSITY CORPORATION, Fukuoka (JP)

(72) Inventor: Shigeru Fujino, Fukuoka (JP)

(73) Assignee: KYUSHU UNIVERSITY, NATIONAL UNIVERSITY CORPORATION, Fukuoka (JP)

( * ) Notice: Subject to any disclaimer, the term of this patent is extended or adjusted under 35 U.S.C. 154(b) by 731 days.

(21) Appl. No.: 16/722,242

(22) Filed: Dec. 20, 2019

(65) Prior Publication Data

US 2020/0140318 A1 May 7, 2020

Related U.S. Application Data

(63) Continuation of application No. PCT/JP2018/023813, filed on Jun. 22, 2018.

(51) Int. Cl.
*C03B 19/01* (2006.01)
*B22F 1/10* (2022.01)
(Continued)

(52) U.S. Cl.
CPC ............. *C03B 19/01* (2013.01); *B33Y 10/00* (2014.12); *B33Y 70/10* (2020.01); *C03B 19/06* (2013.01);
(Continued)

(58) Field of Classification Search
CPC ..................................... C03C 1/026
See application file for complete search history.

(56) References Cited

U.S. PATENT DOCUMENTS

| 7,429,422 B2* | 9/2008 | Davidson | C01G 25/02 428/458 |
| 2005/0209357 A1* | 9/2005 | Xu | G03F 7/038 522/71 |
| 2011/0244007 A1 | 10/2011 | Matsui et al. | |

FOREIGN PATENT DOCUMENTS

| CN | 106431367 A | 2/2017 | |
| EP | 950502 A2 * | 10/1999 | B29C 33/3842 |

(Continued)

OTHER PUBLICATIONS

European Search Report for European Patent Application No. 18819987.1.

(Continued)

*Primary Examiner* — Michael F Pepitone
(74) *Attorney, Agent, or Firm* — Taro Yaguchi

(57) ABSTRACT

A resin composition for inorganic molded article production use, which is provided with inorganic particles each containing amorphous $SiO_2$ and a photocurable resin composition, in which the photocurable resin composition contains a photocurable resin precursor and a photopolymerization initiator, the content of the inorganic particles is 60% by mass or more with respect to the total amount of the photocurable resin composition and the inorganic particles and is 60% by mass or more with respect to the entire amount of the resin composition for inorganic molded article production use, and the viscosity of the composition for inorganic molded article production use is 10000 mPa·s or less.

12 Claims, 5 Drawing Sheets

(51) Int. Cl.
*B33Y 10/00* (2015.01)
*B33Y 70/10* (2020.01)
*C03B 19/06* (2006.01)
*C03C 1/02* (2006.01)
*C03C 3/06* (2006.01)
*C08K 3/36* (2006.01)

(52) U.S. Cl.
CPC ............... *C03C 1/026* (2013.01); *C03C 3/06* (2013.01); *C08K 3/36* (2013.01); *B22F 1/10* (2022.01); *C03C 2201/02* (2013.01); *C03C 2203/34* (2013.01); *C03C 2204/00* (2013.01)

(56) References Cited

FOREIGN PATENT DOCUMENTS

| EP | 0950502 | A2 | | 10/1999 | |
|---|---|---|---|---|---|
| JP | 2000-119373 | A | | 4/2000 | |
| JP | 2004-143247 | A | | 5/2004 | |
| JP | 2008-189530 | A | | 8/2008 | |
| WO | WO-2010045105 | A1 | * | 4/2010 | ............ A61K 6/083 |
| WO | 2010-064696 | A1 | | 6/2010 | |
| WO | 2016-071811 | A1 | | 5/2016 | |
| WO | 2016-140316 | A1 | | 9/2016 | |

OTHER PUBLICATIONS

Fersini M et al: "Rapid prototyping of amorphous silica through laser stereolithography", Proceedings of the 3nd International Conference on Advanced Research in Virtual and Rapid Prototyping, Leiria, Portugal, Sep. 24-29, 2007, Taylor & Francis, London [U.A.], Sep. 17, 2007 (Sep. 17, 2007), pp. 353-358, XP009525554, ISBN: 978-0-415-41602-3.

Maciej Wozniak et al: "Rheology of UV curable colloidal silica dispersions for rapid prototyping applications", Journal of the European Ceramic Society, Elsevier Science Publishers, Barking, Essex, GB, vol. 31, No. 13, May 5, 2011 (May 5, 2011), pp. 2221-2229, XP028241319, ISSN: 0955-2219, DOI: 10.1016/J.JEURCERAMSOC.2011.05.004 [retrieved on May 25, 2011].

Carola Esposito Corcione et al: "Free form fabrication of silica moulds for aluminium casting by stereolithography", Rapid Prototyping Journal, vol. 12, No. 4, Aug. 1, 2006 (Aug. 1, 2006), pp. 184-188, XP055201330, ISSN: 1355-2546, DOI: 10.1108/13552540610682688.

International Search Report for International application No. PCT/JP2018/023813.

* cited by examiner

COMPOSITION FOR INORGANIC MOLDED ARTICLE PRODUCTION USE, AND METHOD FOR PRODUCING INORGANIC MOLDED ARTICLE

TECHNICAL FIELD

The present invention relates to a composition for inorganic molded article production use and a method for producing an inorganic molded article.

Priority is claimed on Japanese Patent Application No. 2017-122965, filed on Jun. 23, 2017, the content of which is incorporated herein by reference.

BACKGROUND ART

In recent years, inexpensive and highly functional transparent members have been investigated in various fields such as electronic equipment, medicine, and automobiles. Examples of a forming material for the transparent member include a polymer material having transparency and an inorganic material typified by glass.

Among these, the polymer material has a feature that a production process is easy and members of various shapes can be easily formed. On the other hand, the polymer material is generally inferior to the inorganic material in transparency. In addition, the polymer material is generally inferior to the inorganic material in durability such as heat resistance and chemical resistance. Therefore, in recent years, there has been a demand for replacing the transparent member formed using the polymer material with the transparent member using the inorganic material as the forming material. The transparent member using the inorganic material as the forming material can be expected to exhibit higher performance than a member using the polymer material as the forming material.

In the investigation of the transparent member using the inorganic material, it is necessary to form members having various shapes using inorganic materials. As a method for forming a three-dimensional object having a desired shape using an inorganic material as a forming material, for example, it is known that a method for modeling a desired three-dimensional shape using a known stereolithography and using a composition in which inorganic fine particles are dispersed in a photocurable resin by known stereolithography (for example, refer to Patent Document 1).

CITATION LIST

Patent Literature

[Patent Document 1] Japanese Unexamined Patent Application, First Publication No. 2004-143247

DISCLOSURE OF INVENTION

Technical Problem

Patent Document 1 discloses that a ceramic fired body is obtained by firing the obtained three-dimensional object using a ceramic powder as inorganic fine particles. However, in Patent Document 1, there is no description of a method for molding a three-dimensional object having transparency. In general, when a sintered body obtained by sintering a ceramic powder is irradiated with light, an opaque molded article is obtained due to scattering at grain boundaries inside the sintered body and scattering due to vacancies and foreign phases inside the sintered body. Thus, it is considered that a transparent member having sufficient transparency and a desired shape cannot be formed in the method described in Patent Document 1.

Therefore, there has been a demand for a material and a production method capable of easily forming a transparent member using an inorganic material as a forming material.

The present invention has been made in view of such circumstances and an object thereof is to provide a composition for inorganic molded article production use which is suitably used as a raw material for a transparent member using an inorganic material as a forming material and is capable of easily forming a transparent member having a desired shape. Another object thereof is to provide a method for producing an inorganic molded article capable of easily forming a transparent member having a desired shape using an inorganic material as a forming material.

Solution to Problem

In order to achieve the above objects, an aspect of the present invention is as follows.

[1] There is provided a composition including: inorganic particles; and a photocurable resin composition, in which the inorganic particle includes a particle main body having an amorphous inorganic material as a main component, and a surface treatment layer covering at least a part of a surface of the particle main body, the amorphous inorganic material contains amorphous $SiO_2$, the photocurable resin composition includes a photocurable resin precursor and a photopolymerization initiator, and a content of the inorganic particles is 60% by mass or more with respect to the total amount of the photocurable resin composition and the inorganic particles.

[2] There is provided a composition including: inorganic particles; and a photocurable resin composition, in which the inorganic particle includes a particle main body including a first amorphous inorganic material and a second crystalline inorganic material, and a surface treatment layer covering at least a part of a surface of the particle main body, the first amorphous inorganic material contains amorphous $SiO_2$, the second crystalline inorganic material has a crystallite diameter of 50 nm or less, the photocurable resin composition includes a photocurable resin precursor, and a photopolymerization initiator, and a content of the inorganic particles is 60% by mass or more with respect to a total amount of the photocurable resin composition and the inorganic particles.

[3] In the aspect of the present invention according to [1] or [2], the surface treatment layer may be formed using a silane coupling agent as a forming material.

[4] In the aspect of the present invention according to any one of [1] to [3], the inorganic particle may be spherical.

[5] In the aspect of the present invention according to any one of [1] to [4], the particle main body may contain either or both of $TiO_2$ and $Al_2O_3$ as a forming material.

[6] In the aspect of the present invention according to any one of [1] to [5], the photocurable resin precursor may be an acrylic monomer.

[7] In the aspect of the present invention according to any one of [1] to [6] may further include: a dispersion medium.

[8] In the aspect of the present invention according to [7], the dispersion medium may be an organic solvent.

[9] There is provided a method for producing an inorganic molded article including: a step of forming a first molded article containing inorganic particles and a photocurable resin by irradiating the composition with light; a step of forming a second molded article using the inorganic particles as a forming material by firing the first molded article and removing the photocurable resin; and a step of sintering the second molded article.

[10] In the aspect of the present invention, in the production method according to [9], a viscosity of the composition may be 5000 mPa·s or more, the step of forming the first molded article may include a step of forming a pattern of the composition by selectively applying the composition, and a step of forming a cured article having a shape of the pattern by irradiating the pattern of the composition with the light, and the first molded article may be formed as a laminate of the cured article by alternately performing the step of forming the pattern and the step of forming the cured article.

[11] In the aspect of the present invention, in the production method according to [9], a viscosity of the composition may be less than 5000 mPa·s, the step of forming the first molded article may include a step of forming a pattern of a cured article of the composition by selectively irradiating the composition with the light, and a step of supplying the composition to a surface of the pattern of the cured article, and the first molded article may be formed as a laminate of the cured article by alternately performing the step of forming the pattern and the step of supplying the composition.

That is, in order to achieve the above objects, an aspect of the present invention is as follows.

[1] A resin composition for inorganic molded article production use including: inorganic particles containing amorphous $SiO_2$, and a photocurable resin composition, in which the photocurable resin composition includes a photocurable resin precursor, and a photopolymerization initiator, a content of the inorganic particles is 60% by mass or more with respect to a total amount of the photocurable resin composition and the inorganic particles and is 60% by mass or more with respect to an entire amount of the resin composition for inorganic molded article production use, and a viscosity is 10000 mPa·s or less.

[2] The composition for inorganic molded article production use according to [1], in which the inorganic particle includes a particle main body having an amorphous inorganic material as a main component, and a surface treatment layer covering at least a part of a surface of the particle main body, and the amorphous inorganic material contains amorphous $SiO_2$.

[3] The composition for inorganic molded article production use according to [1], in which the inorganic particle includes a particle main body including a first amorphous inorganic material and a second crystalline inorganic material, and a surface treatment layer covering at least a part of a surface of the particle main body, the first amorphous inorganic material contains amorphous $SiO_2$, and the second inorganic material has a crystallite diameter of 50 nm or less.

[4] The composition for inorganic molded article production use according to [2] or [3], in which the surface treatment layer is formed using a silane coupling agent as a forming material.

[5] The composition for inorganic molded article production use according to [1], in which the inorganic particle contains amorphous $SiO_2$ as a main component, and an absolute value of a difference between a solubility parameter of the photocurable resin composition and a solubility parameter of the inorganic particle is 4 or less.

[6] The composition for inorganic molded article production use according to [1], in which the inorganic particle includes a first inorganic material which is amorphous $SiO_2$, and a second crystalline inorganic material, the second inorganic material has a crystallite diameter of 50 nm or less, and an absolute value of a difference between a solubility parameter of the photocurable resin composition and a solubility parameter of the inorganic particles is 4 or less.

[7] The composition for inorganic molded article production use according to any one of [1] to [5], in which the inorganic particle is spherical.

[8] The composition for inorganic molded article production use according to any one of [1] to [7], in which the inorganic particles contain either or both $TiO_2$ and $Al_2O_3$ as a forming material.

[9] The composition for inorganic molded article production use according to any one of [1] to [8], in which the photocurable resin precursor is an acrylic monomer.

[10] The composition for inorganic molded article production use according to any one of [1] to [9], further including: a dispersion medium.

[11] The composition for inorganic molded article production use according to [10], in which the dispersion medium is an organic solvent.

[12] A method for producing an inorganic molded article including: a step of forming a first molded article including inorganic particles and a photocurable resin by irradiating the composition for inorganic molded article production use according to any one of [1] to [11] with light; a step of forming a second molded article using the inorganic particles as a forming material by firing the first molded article and removing the photocurable resin; and a step of sintering the second molded article.

[13] The method for producing an inorganic molded article according to [12], in which a viscosity of the composition for inorganic molded article production use is 5000 mPa·s or more and 10000 mPa·s or less, the step of forming the first molded article includes a step of forming a pattern of the composition for inorganic molded article production use by selectively applying the composition for inorganic molded article production use, and a step of forming a cured article having a shape of the pattern by irradiating the pattern of the composition for inorganic molded article production use with the light, and the first molded article is formed as a laminate of the cured article by alternately performing the step of forming the pattern and the step of forming the cured article.

[14] The method for producing an inorganic molded article according to [12], in which a viscosity of the composition for inorganic molded article production use is less than 5000 mPa·s, the step of forming the first molded article includes a step of forming a pattern of a cured article of the composition for inorganic molded article production use by selectively irradiating the composition for inorganic molded article production use with the light, and a step of supplying the composition for inorganic molded article production use to a surface of the pattern of the cured article, and the first molded article is formed as a laminate of the cured article by alternately performing the step of forming the pattern and the step of supplying the composition for inorganic molded article production use.

Advantageous Effects of Invention

According to the present invention, it is possible to provide a composition for inorganic molded article production use that is suitably used as a raw material for a transparent member using an inorganic material as a forming material and is capable of easily forming a transparent member having a desired shape. In addition, it is possible to provide a method for producing an inorganic molded article capable of easily forming a transparent member having a desired shape using an inorganic material as a forming material.

BEST MODE FOR CARRYING OUT THE INVENTION

Figure 1:
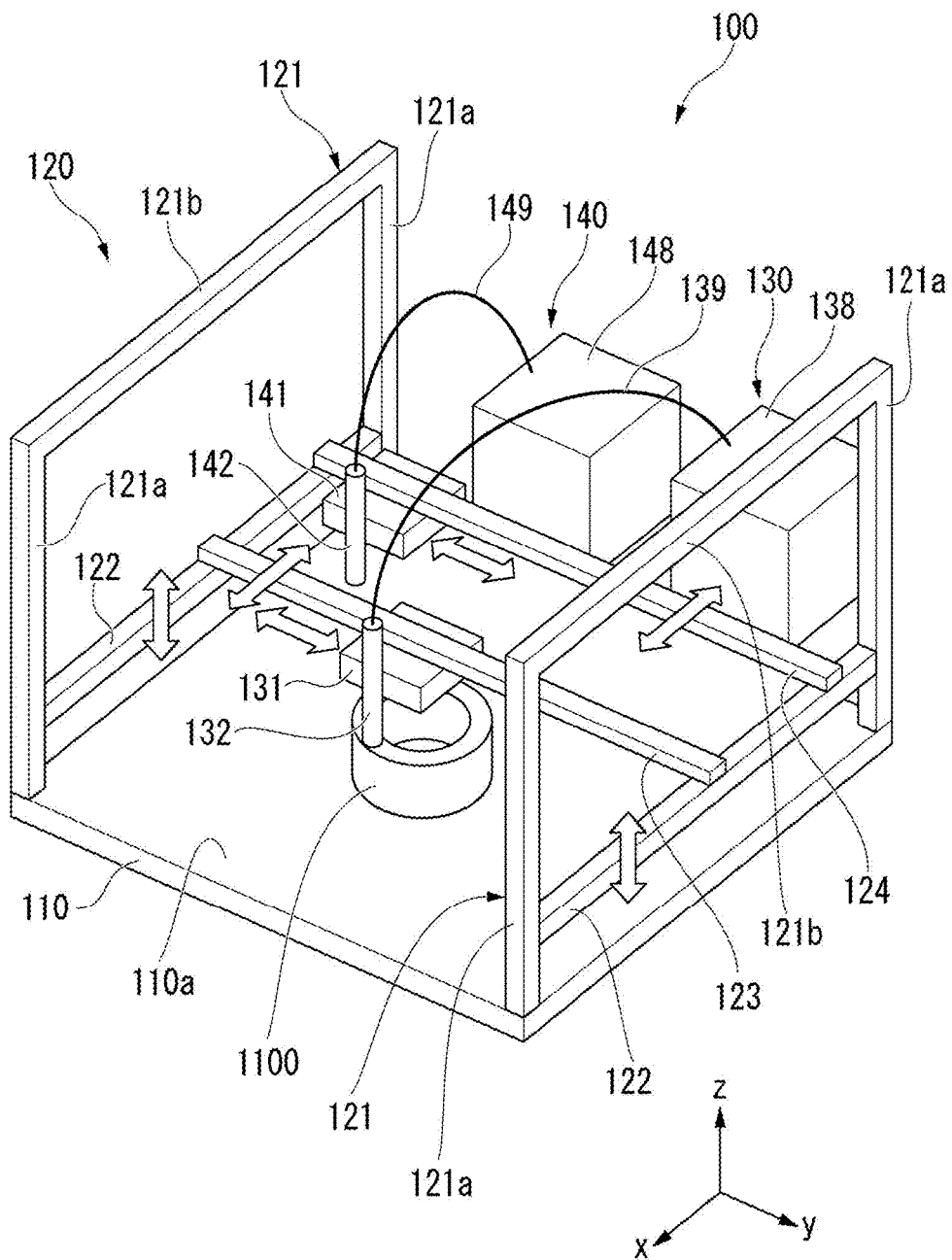
FIG. 1 is an explanatory view showing an example of a step of forming a first molded article.

<Composition for Inorganic Molded Article Production Use>

A composition for inorganic molded article production use according to an embodiment includes inorganic particles containing amorphous $SiO_2$, and a photocurable resin composition described later. In addition, the content of the inorganic particles in the composition for inorganic molded article production use according to the embodiment is 60% by mass or more with respect to a total amount of the photocurable resin composition and the inorganic particles. In addition, the content of the inorganic particles in the composition for inorganic molded article production use according to the embodiment is 60% by mass or more with respect to the entire amount of the resin composition for inorganic molded article production use. Further, the viscosity of the composition for inorganic molded article production use according to the embodiment is 10000 mPa·s or less.

As will be described in detail later, by performing stereolithography using the composition for inorganic molded article production use according to the embodiment, and firing the obtained molded article, a transparent inorganic molded article (transparent member) formed using an inorganic material as a forming material can be easily obtained. That is, the composition for inorganic molded article production use according to the embodiment is suitably used as a raw material for a transparent member, that is, a composition for transparent inorganic molded article production use. In the following description, the "composition for inorganic molded article production use" is sometimes simply referred to as "composition".

In a case of producing an inorganic molded article having desired transparency, size and shape by the method roughly described above, shrinkage during firing has a significant effect on the finish. In order to suppress shrinkage during firing and to suitably control the transparency, size, and shape of the obtained inorganic molded article, it is considered that the content of the inorganic particles in the composition for transparent inorganic molded article use may be increased.

However, the content of the inorganic particles in the composition is increased to 60% by mass or more, the fluidity of the composition is decreased and the composition is not suitable for stereolithography.

In contrast, in the present invention, by forming a composition having a constitution described later, the viscosity of the obtained composition is controlled to 10000 mPa·s or less. Thus, the composition for transparent inorganic molded article use according to the embodiment has both a high content and fluidity suitable for stereolithography.

As long as the viscosity of the composition is within a range of 10000 mPa·s or less, the viscosity can be set to 5000 mPa·s or less and can be set to more than 5000 mPa·s. As long as the viscosity is enough to mold a molded article (first molded article) by the method described below, the viscosity of the composition is not limited to 10000 mPa·s or less, and may be more than 10000 mPa·s.

Hereinafter, description will be made in order.

First Embodiment (Inorganic Particles)

The inorganic particle of the composition of the first embodiment has a particle main body formed using an inorganic material as a forming material, and a surface treatment layer covering at least a part of the surface of the particle main body.

(Particle Main Body)

The particle main body includes a first amorphous inorganic material and a second crystalline inorganic material. The first amorphous inorganic material has transparency. In addition, the second inorganic material has a crystallite diameter of 50 nm or less. The crystallite diameter of the second inorganic material is smaller than the particle diameter that causes Rayleigh scattering for light in the visible light range. Therefore, the particle main body having the first inorganic material and the second inorganic material has transparency.

In the embodiment, the content of the first inorganic material of the forming material of the particle main body is, for example, 30% by mass or more and can be set to 50% by mass or more.

In addition, in the embodiment, as the forming material of the particle main body, the first inorganic material can be used as a main component and may not be used as a main component. In a case of using the first inorganic material as a main component, the particle main body can be constituted of only the first inorganic material. Hereinafter, a case where the forming material of the particle main body has the first inorganic material as a main component will be described.

With respect to the particle main body, the expression having an amorphous inorganic material as "a main component" means that 80% by mass or more of the amorphous inorganic material is contained in the forming material of the particle main body. In the embodiment, the content of the amorphous inorganic material in the forming materials of the particle main body can be set to, for example, 90% by mass or more, 95% by mass or more, and 98% by mass or more. That is, in the embodiment, the content of the first amorphous inorganic material in the forming materials of the particle main body can be set to, for example, 80% by mass or more, 90% by mass or more, 95% by mass or more, and 98% by mass or more.

The inorganic particles exhibit transparency by using the amorphous inorganic material of the particle main body as a main component.

The amorphous inorganic material constituting the particle main body of the embodiment contains amorphous $SiO_2$. Examples of the inorganic material containing amorphous $SiO_2$ include quartz glass (silica glass), soda lime glass, and PYREX (registered trademark) glass.

In addition, the particle main body can contain another inorganic material as a forming material. For example, particle main body can contain either or both $TiO_2$ and $Al_2O_3$ as a forming material.

In a case where the particle main body contains $TiO_2$ as a forming material, as compared to a case where the particle main body does not contain $TiO_2$, the expansion coefficient of the inorganic particles is low. Therefore, when an inorganic molded article (described later) using the composition of the embodiment is molded, distortion does not occur easily and the molded article can be molded with high accuracy. In addition, the photocatalytic function of $TiO_2$ can be imparted to the formed inorganic molded article.

In a case where the particle main body contains $Al_2O_3$ as a forming material, as compared to a case where the particle main body does not contain $Al_2O_3$, the inorganic molded article formed using the composition of the embodiment has high strength.

Further, the particle main body can contain at least one of the following compounds as a forming material as long as the effects of the invention that the compound is suitably used as a raw material for the transparent member are not impaired. Examples of the compounds that may be contained in the particle main body include:
  silicon compounds such as Si, and SiC;
  metal elements such as Au and Ag;
  carbon allotropes and oxides of carbon allotropes such as graphene, graphene oxide, carbon nanotubes, fullerenes, nanodiamonds and mesoporous carbons; metal oxides such as $CuO$, $Fe_2O_3$, $Co_2O_3$, $ZnO$, $ZrO_2$, $CeO_2$, indium tin oxide (ITO), antimony tin oxide (ATO), $Li_2O$, $Na_2O$, $K_2O$, $MgO$, $CaO$, $SrO$, $BaO$, $Y_2O_3$, $Mn_2O_3$, $In_2O_3$, $SnO_2$, $La_2O_3$, $Pr_2O_3$, $Nd_2O_3$, $Sm_2O_3$, $Eu_2O_3$, $Gd_2O_3$, $Tb_2O_3$, and $Dy_2O_3$; and
  hydroxyapatite.

Other inorganic materials that can be contained in these particle main bodies may be amorphous or crystalline.

Regarding other inorganic materials that can be contained in these particle main bodies, in an aggregation of plurality of inorganic particles (particle main body), the particle main body may be formed using a single forming material. In this case, the aggregation of the inorganic particles includes the inorganic particles containing the particle main body formed using amorphous $SiO_2$ as a forming material and inorganic particles including a particle main body using another inorganic material as a forming material.

In addition, other inorganic materials that can be contained in these particle main bodies may form the particle main body together with the amorphous $SiO_2$ in the inorganic particles (particle main body). In this case, the particle main body is formed using a mixture of amorphous $SiO_2$ and another inorganic particles as a forming material.

The particle main body may have a shape that is easy to be densely filled in the production method described later. As long as the particle main body has such a property of being easily filled, various shapes can be adopted as the shape of the particle main body. Examples of such a shape of the particle main body include a spherical shape. In a case where the particle main body is spherical, the inorganic particles are also spherical. The term "spherical" used herein includes those whose shape is collapsed from a true sphere due to production errors or the like.

In addition, it is preferable that the particle main body preferably does not have crystal orientation. When an inorganic molded article is produced by the production method in the present invention using the particle main body not having crystal orientation, it is possible to obtain an inorganic molded article having transparency.

In addition, in this specification, the fact that the inorganic particles are "spherical" used herein is evaluated based on the outline shape in a case where the particles are observed at a magnification of 10000 times using a scanning electron microscope (SEM).

Further, as the forming material of the particle main body, a material obtained by further doping the above-mentioned amorphous $SiO_2$ or another inorganic material with a metal element can be used. Examples of metal elements to be doped include gold, silver, transition metal elements, and rare earth elements. As long as the effects of the invention are not impaired, the doping amount of the metal element can be determined according to the kind of element to be doped. For example, the metal element can be doped up to about 1% by mole with respect to the above-mentioned amorphous $SiO_2$ and another inorganic material.

By doping the above-mentioned metal element into the forming material of the particle main body, the refractive index of inorganic particles prepared using the forming material can be adjusted.

For the particle main body, particles having an average particle diameter of nanometer order to particles having an average particle diameter of micrometer order can be used.

For example, in the particle main body, particles having an average particle diameter of micrometer order can be used. In this case, the average particle diameter of the particle main body can be, for example, 0.1 μm or more and 100 μm.

In the embodiment, as described later, the inorganic particles in which a surface treatment layer is formed on the surface of the particle main body are used. In this case, as the average particle diameter of the particle main body becomes smaller, the surface area of the particle main body is relatively increased, and the surface treatment tends to be insufficient. In contrast, when the particle main body has an average particle diameter of micrometer order, the surface treatment layer with an amount suitable for the surface of the particle main body can be formed.

In addition, for the particle main body, particles having an average particle diameter of nanometer order can be used. In this case, the average particle diameter of the particle main body is, for example, 1 nm or more and 100 nm.

When the particle main body has average particle diameter of nanometer order, as compared to a case of the particle main body using the particles having an average particle diameter of micrometer order, the sintering temperature described later can be further lowered. Therefore, the production efficiency of the inorganic molded article is easily improved.

(Surface Treatment Layer)

The surface treatment layer is a layer that that is formed using, for example, a silane coupling agent as a forming material and covers at least a part of the surface of the particle main body. When the inorganic particle includes the surface treatment layer, non-uniform aggregation between the inorganic particles can be suppressed, and the inorganic particles can be favorably dispersed in the photocurable resin composition. Thus, the content rate of the inorganic particle in a composition can be increased.

The surface treatment layer can be formed, for example, by mixing and stirring the particle main body and the silane coupling agent.

The amount of the silane coupling agent used when forming the surface treatment layer can be, for example, 0.1% by mass or more and 10% by mass or less with respect to the particle main body. The amount of the silane coupling agent used can be, for example, 0.5% by mass or more and 0.7% by mass or more with respect to the particle main body. In addition, the amount of the silane coupling agent used can be, for example, 5% by mass or less and 1.2% by mass or less with respect to the particle main body.

The upper limit and lower limit of the amount of silane coupling agent used can be arbitrarily combined.

Examples of the silane coupling agent include compounds having one or more hydrolyzable groups capable of forming a siloxane bond with a hydroxyl group (—OH) present on the surface of the particle main body by hydrolysis. Examples of the hydrolyzable group include a halogen group and an alkoxysilyl group. Examples of the halogen group include a chlorine atom and a bromine atom.

Moreover, such a silane coupling agent can have an acryl group and a methacryl group as a functional group.

Examples of such silane coupling agents include 3-methacryloxypropylmethyldimethoxysilane, 3-methacryloxypropyltrimethoxysilane, 3-methacryloxypropylmethyldiethoxysilane, 3-methacryloxypropyltriethoxysilane, and 3-acryloxypropyltrimethoxysilane.

The amount of the surface treatment layer in the inorganic particles can be obtained, for example, from the result of thermo gravimetry (TG) of the inorganic particles as the amount of the surface treatment layer before and after the measurement.

The thermo gravimetry is performed under the following conditions, for example.

Device: TG-60 (manufactured by Shimadzu Corporation)
Sample: Surface-modified inorganic particles of tens of mg are precisely weighed
Reference: α-alumina 10 mg
Cell: platinum cell
Temperature range: room temperature to 600° C.
Temperature rising rate: 5° C./min
Circulating gas: air (50 mL/min)

(Photocurable Resin Composition)

The photocurable resin composition contained in the composition of the embodiment includes a photocurable resin precursor and a photopolymerization initiator.

As the photocurable resin precursor, a commonly known monomer or oligomer used as a raw material (precursor) for a photocurable resin can be used.

As the photocurable resin precursor, for example, an acrylic monomer or oligomer can be used since the acrylic monomer or oligomer is highly transparent and hardly inhibits the photocuring reaction. In addition, an epoxy-type monomer and an oligomer, a urethane-type monomer and an oligomer are also exemplary examples.

As the acrylic monomer, various monomers can be used as long as the monomer is an acrylic ester or methacrylic ester. In addition, as the acrylic oligomer, various monomers can be used as long as the oligomer is an oligomer having an acrylic ester portion or a methacrylic ester portion in the molecular structure.

Examples of acrylic monomers include monofunctional monomers or monofunctional oligomers having one acryloyl group or methacryloyl group in the molecule such as polyethylene glycol monoacrylate, polypropylene glycol monoacrylate, cyclohexanedimethanol monoacrylate (CHDMMA), isobutyl acrylate (IBA), isobornyl acrylate (IBXA), tetrahydrofurfuryl acrylate (THFA), 2-hydroxyethyl acrylate (2-HEA), 2-hydroxyethyl methacrylate (2-HEM), hydroxypropyl acrylate (HPA), hydroxypropyl methacrylate (HPM), 4-hydroxybutyl acrylate (4-HBA), diethylene glycol monoethyl ether acrylate, phenoxyethyl acrylate, ethoxylated o-phenylphenol acrylate, methoxy polyethylene glycol #400 acrylate, methoxy polyethylene glycol #550 acrylate, phenoxy polyethylene glycol acrylate, 2-acryloyloxyethyl succinate, isostearyl acrylate, 2-methacryloyloxyethyl phthalate, methoxy polyethylene glycol #400 methacrylate, methoxy polyethylene glycol #1000 methacrylate, phenoxyethylene glycol methacrylate, stearyl methacrylate, and 2-methacryloyloxyethyl succinate.

In addition, examples of acrylic monomers include bifunctional monomers and bifunctional oligomers having two acryloyl groups or methacryloyl groups in the molecule such as 1-(acryloyloxy)-3-(methacryloyloxy)-2-propanol, APG-400 (polypropylene glycol #400 diacrylate), tetraethyleneglycodiacrylate, 2-hydroxy-3-acryloyloxypropyl methacrylate, polyethylene glycol #200 diacrylate, polypropylene glycol #400 diacrylate, polyethylene glycol #600 diacrylate, polyethylene glycol #1000 diacrylate, ethoxylated bisphenol A diacrylate, tricyclodecane dimethanol diacrylate, 1,10-decanediol diacrylate, 1,6-hexanediol diacrylate, 1,9-nonanediol diacrylate, dipropylene glycol diacrylate, tripropylene glycol diacrylate, ethylene glycol dimethacrylate, diethylene glycol dimethacrylate, triethylene glycol dimethacrylate, polyethylene glycol #200 dimethacrylate, polyethylene glycol #400 dimethacrylate, polyethylene glycol #600 dimethacrylate, polyethylene glycol #1000 dimethacrylate, ethoxy Bisphenol A dimethacrylate, tricyclodecane dimethanol dimethacrylate, 1,6-hexanediol dimethacrylate, 1,9-nonanediol dimethacrylate, neopentyl glycol dimethacrylate, glycerin dimethacrylate, polypropylene glycol #400 dimethacrylate, and tetraethylene glycol diacrylate.

By using the monofunctional monomer, the bifunctional monomer, the monofunctional oligomer, or the bifunctional oligomer as the photocurable resin precursor, it is possible to reduce the shrinkage ratio of the composition after firing from before firing.

Further, as the photocurable resin precursor, a polyfunctional monomer or polyfunctional oligomer having three or more acryloyl groups or methacryloyl groups in the molecule can also be used. By using the polyfunctional monomer or the polyfunctional oligomer as the photocurable resin precursor, the photocuring rate of the composition can be improved.

These monomers or oligomers may be used alone or in combination of two or more thereof.

(Photopolymerization Initiator)

As the photopolymerization initiator, various initiators can be used as long as the photopolymerization initiator is a commonly known photopolymerization initiator. In the composition of this embodiment, a ketone compound can be used as the photopolymerization initiator from the viewpoint of ease of handling.

As the photopolymerization initiator, for example, 1-hydroxycyclohexyl-phenyl ketone, diphenyl(2,4,6-trimethylbenzoyl)phosphine oxide, 2-ethylanthraquinone, and 1-hydroxycyclohexyl phenyl ketone.

In the composition of the embodiment, the above-mentioned inorganic particles can be formulated to be contained as much as possible with respect to the total amount of the photocurable resin composition and the inorganic particles. In the composition of the embodiment, the content of the inorganic particles is 60% by mass or more with respect to the total amount of the photocurable resin composition and the inorganic particles. In the composition of the embodiment, the content of the inorganic particles can be 70% by mass or more and 80% by mass or more with respect to the total amount of the photocurable resin composition and the inorganic particles.

In addition, the composition of the embodiment contains 60% by mass or more of the inorganic particles with respect to the entire amount of the composition. The composition of the embodiment can also contain the inorganic particles at a content of 70% by mass or more and 80% by mass or more with respect to the entire amount of the composition.

The content of the inorganic particles in the composition can be adjusted by controlling the shape and particle size distribution of the inorganic particles. For example, when the composition has spherical inorganic particles and further includes fine inorganic particles or non-spherical inorganic particles that are filled between the spherical inorganic particles, the content of the inorganic particles in the composition can be easily increased. In addition, in a case where the inorganic particles are spherical, the fluidity of the composition is easily improved, and the molding of an inorganic molded article is facilitated.

When the composition of the embodiment includes a larger amount of inorganic particles with respect to the total amount of the photocurable resin composition and the inorganic particles, the shrinkage ratio after and before firing in the production of the inorganic molded article described later is reduced. Thus, the shrinkage of the inorganic molded article becomes isotropic, and a desired shape is easily obtained. In addition, since the shrinkage of the inorganic molded article is isotropic, breakage during shrinkage can be suppressed.

(Other Contained Materials)

In addition, the composition of this embodiment can include a dispersion medium in the range which does not impair the effects of invention. By using a dispersion medium, the dispersion of the inorganic particles in the composition is promoted. In addition, the dispersion medium can be used to adjust the concentration of the composition.

As the dispersion medium, an organic solvent can be used. Water may be mixed with the organic solvent, or only the organic solvent may be used without mixing with water. As the organic solvent, for example, hydrocarbons such as hexane, esters such as ethyl acetate, ketones such as acetone and methyl ethyl ketone, and ethers such as tetrahydrofuran can be used. These organic solvents may be used alone or in combination of two or more thereof.

Moreover, the above-mentioned organic solvents (hexane, ethyl acetate, acetone, methyl ethyl ketone, tetrahydrofuran) have a higher vapor pressure and a lower boiling point than water. Therefore, by using these organic solvents in the composition, the composition is easily dried at the time of molding an inorganic molded article, and the production efficiency can be easily improved.

In a case where the dispersion medium is an organic solvent, in the method for producing an inorganic molded article described later, the dispersion medium is easily dried and removed. Therefore, a molded article can be efficiently produced by suppressing cracks (breakage) in a molded article to be formed.

In addition, the amount of the dispersion medium used can be set to 10% by mass or less, 5% by mass or less, and 2% by mass or less with respect to the entire amount of the composition. As the amount of the dispersion medium used becomes smaller, the molded article hardly shrinks when the first molded article described later is molded, and the first molded article having a desired shape is easily obtained.

The composition of the embodiment is constituted as described above.

In the composition for inorganic molded article production use of the first embodiment as described above, by providing the surface treatment layer on the surface of the inorganic particles, the viscosity of the resulting composition can be set to 10000 mPa·s or less.

Second Embodiment (Inorganic Particles)

Inorganic particles contained in a composition of a second embodiment are obtained by removing the surface treatment layer from the inorganic particles contained in the composition of the first embodiment. That is, the inorganic particle contained in the composition of the second embodiment corresponds to the particle main body contained in the composition of the first embodiment.

(Photocurable Resin Composition)

The photocurable resin composition contained in the composition of the embodiment includes a photocurable resin precursor and a photopolymerization initiator.

In the composition of the embodiment, the photocurable resin composition to be used is selected by paying attention to the solubility parameter of the photocurable resin composition and the solubility parameter of the inorganic particles. That is, in the composition of the embodiment, a photocurable resin composition is selected such that an absolute value of a difference between the solubility parameter of the photocurable resin composition and the solubility parameter of the inorganic particles is 4 or less.

By controlling the absolute value of the difference between the solubility parameter of the photocurable resin composition and the solubility parameter of the inorganic particles as described above, the inorganic particles can be favorably dispersed in the photocurable resin composition. Thus, the content of the inorganic particles in the composition can be increased.

In this specification, the term "solubility parameter" refers to the Hildebrand solubility parameter (SP value, unit: $MPa^{1/2}$). As the solubility parameter, a literature value described in, for example, "Chemistry and Application of Silsesquioxane Materials" (2007, CMC Publishing), "Hansen Solubility Parameters: A User's Handbook" (2007), or the like, or a value calculated based on the following equation based on the polarization term ($\delta P$), hydrogen bond term ($\delta H$), and dispersion term ($\delta D$) of the Hansen solubility parameter described as a literature value can be adopted.

[SP Value]=$\sqrt{(\delta P^2 + \delta H^2 + \delta D^2)}$

In addition, in a case where the solubility parameter of the photocurable resin composition is unknown, it can be used that a value obtained by measurement by a known method or a value estimated using a known Fedors' estimation method (refer to Polymer Engineering and Science 14 [2], 147-154 (1974)) based on or the molecular structure of the monomer used.

In addition, in a case where the solubility parameter of the photocurable resin composition is calculated, the solubility parameter is calculated including the dispersion medium contained in the photocurable resin composition. Further, in the case where the solubility parameter of the photocurable resin composition is calculated, the solubility parameter is calculated excluding the polymerization initiator contained in the photocurable resin composition.

When the absolute value of the difference between the solubility parameter of the photocurable resin composition and the solubility parameter of the inorganic particles is 4 or less, the inorganic particles are suitably dispersed in the photocurable resin composition and are hardly aggregated. As a result, the viscosity of the obtained composition for inorganic molded article production use is easily controlled to 10000 mPa·s or less and the fluidity is easily secured.

The absolute value of the difference between the solubility parameter of the photocurable resin composition and the solubility parameter of the inorganic particles can be set to 3 or less and 2 or less.

For example, in a case of adopting silica particles as the inorganic particles, a photocurable resin composition having such a solubility parameter that the absolute value is 4 or less with reference to the solubility parameter of silica of "25" can be used.

In the composition for inorganic molded article production use of the second embodiment as described above, by setting the absolute value of the difference between the solubility parameter of the photocurable resin composition and the solubility parameter of the inorganic particles to 4 or less, the viscosity of the obtained composition can be set to 10000 mPa·s or less.

Needless to say, the first embodiment and the second embodiment can be appropriately combined. For example, for the composition having the surface treatment layer on the inorganic particles described in the first embodiment, as in the second embodiment, by setting the absolute value of the difference between the solubility parameter of the photocurable resin composition and the solubility parameter of the inorganic particles to 4 or less, 3 or less, or 2 or less, the viscosity of the obtained composition can be set to 10000 mPa·s or less.

(Nanoparticles)

In common with the first embodiment and the second embodiment, as a part of the above-described particle main body may be replaced with nanoparticles as the particle main body. In the specification, the term "nanoparticle" refers to a particle having an average particle diameter of 1 nm or more and 50 nm or less measured by a known laser diffraction scattering method.

As the forming material of the nanoparticles, the forming materials of the above-mentioned particle main body can be adopted.

It is known that the nanoparticles having such an above average particle diameter have high particle surface energy, are active, and are easily aggregated as compared to the particles having an average particle diameter of micrometer order. Therefore, in the composition to which the nanoparticles are added, the nanoparticles or the nanoparticles and the particle main body are easily aggregated. As a result, the composition to which the nanoparticles are added has an increased viscosity of the entire composition as compared with the composition to which the nanoparticles are not added.

That is, when the addition rate of the nanoparticles to the composition increases, the viscosity of the composition increases, and when the addition rate of the nanoparticles to the composition decreases, the viscosity of the composition decreases. The upper limit of the addition rate of the nanoparticles varies depending on the particle diameter of the particle main body used, the forming material, the ratio of the particle main body with respect to the entire composition, the presence of the surface treatment layer of the particle main body, the kind of the photocurable resin composition used, and the like. Therefore, in a case where the viscosity of the composition is controlled by adding the nanoparticles, the relationship between the addition rate of the nanoparticles and the viscosity of the composition is confirmed in advance by preliminary experiments and the addition rate of the nanoparticles may be controlled so as to obtain a desired viscosity.

The composition of the embodiment is constituted as described above.

<Method for Producing Inorganic Molded Article>

A method for producing an inorganic molded article according to an embodiment includes (i) a step of forming a first molded article containing the inorganic particles and a photocurable resin by irradiating the above-mentioned composition with light, (ii) a step of forming a second molded article using the inorganic particles as a forming material by firing the first molded article and removing the photocurable resin, and (iii) a step of sintering the second molded article.

Hereinafter, with reference to FIGS. 1 to 6, the method for producing an inorganic molded article according to the embodiment of the present invention will be described. In all the following drawings, the dimensions and ratios of the respective constituent elements are appropriately changed in order to make the drawings easy to see.

(Step (1) of Forming First Molded Article)

Figure 2:
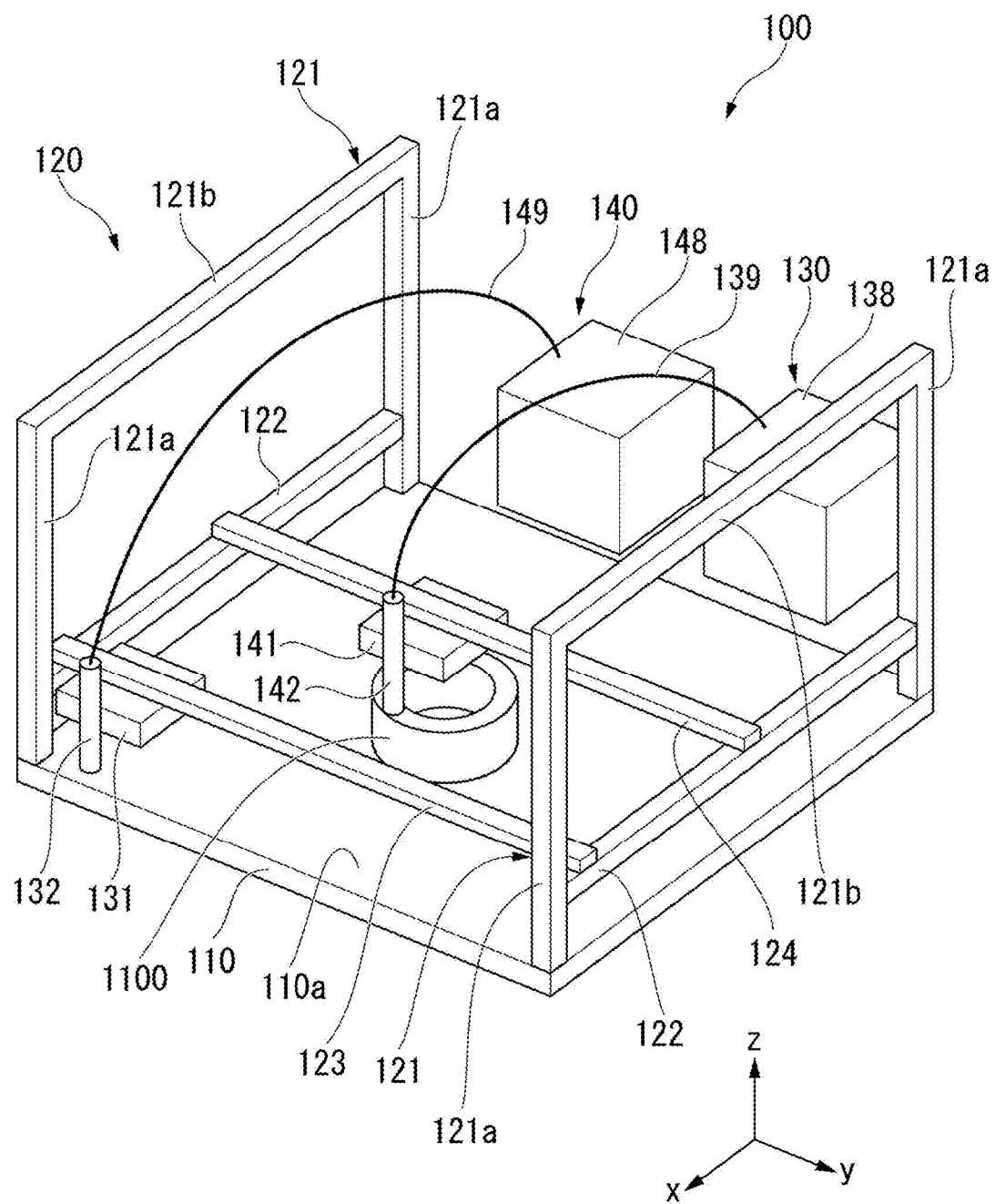
FIG. 2 is an explanatory view showing an example of the step of forming a first molded article.

FIGS. 1 and 2 are explanatory views showing an example of a step of forming a first molded article in the method for producing an inorganic molded article according to an embodiment.

In the description of FIGS. 1 and 2, an xyz orthogonal coordinate system is set, and the positional relationship of each member will be described with reference to the xyz orthogonal coordinate system. Here, a predetermined direction in the horizontal plane is an x-axis direction, a direction orthogonal to the x-axis direction in the horizontal plane is a y-axis direction, and a direction orthogonal to each of the x-axis direction and the y-axis direction (that is, the vertical direction) is a z-axis direction.

As shown in FIGS. 1 and 2, in the method for producing an inorganic molded article according to the embodiment, a first molded article 1100 can be molded using a production device 100.

The production device 100 has a stage 110, a support unit 120, a coating unit 130, and a light irradiation unit 140.

The stage 110 is a plate-like member having a mounting surface 110a parallel to the xy plane. The stage 110 has a rectangular shape in the view field from the normal direction of the mounting surface 110a (in the view field from the z direction).

The support unit 120 has a pair of bridge piers 121, a pair of first rails 122, a second rail 123, and a third rail 124.

Each of the pair of bridge piers 121 includes a pair of column portions 121a provided to extend in the z direction from the corner portions of the stage 110, and a beam portion 121b connecting the upper ends of the column portions 121a. The pair of bridge piers 121 are arranged such that the beam portions 121b are parallel to each other.

The first rail 122 is provided on each of the pair of bridge piers 121. The first rail 122 is a rod-like member that spans the pair of column portions 121a, and is provided to extend in the x direction. The first rail 122 is provided so as to be movable in parallel to the z direction along the column portion 121a.

The second rail 123 is a rod-like member that spans the pair of first rails 122 and is provided to extend in the y direction. The second rail 123 is provided so as to be movable in parallel to the x direction along the first rail 122.

The third rail 124 is a rod-like member that spans the pair of first rails 122 and is provided to extend in the y direction.

The third rail 124 is provided to be movable in parallel to the x direction along the first rail 122.

The coating unit 130 has a head 131, a nozzle 132, a tank 138, and a pipe 139. The coating unit 130 has a function of applying the composition of the embodiment described above to the stage 110.

The head 131 is a member attached to the second rail 123 and configured to be movable in parallel to the y direction along the second rail 123.

The nozzle 132 is a tubular member attached to the head 131. The tip of the nozzle 132 is directed to the mounting surface 110a of the stage 110. The nozzle 132 can be moved in parallel to the y direction along the second rail 123 as the head 131 moves.

The tank 138 stores the composition of the embodiment described above. The tank 138 and the other end of the nozzle 132 are connected by the pipe 139. The composition in the tank 138 is supplied to the nozzle 132 through the pipe 139 using a pump (not shown) and is discharged from the nozzle 132 to the mounting surface 110a.

As shown in FIG. 1, in the production device 100, by controlling the operation of the second rail 123 that can be moved in parallel to the x direction, the head 131 that can be moved in parallel to the y direction, and the first rail 122 that can be moved in parallel to the z direction, the coating unit 130 can selectively applies the composition. Thus, in the production device 100, the pattern of the composition can be formed in an arbitrary shape.

The pattern of the composition is set based on slice data of the shape of the object to be produced (inorganic molded article).

The light irradiation unit 140 has a head 141, a light source 142, a power source 148, and a cable 149. The light irradiation unit 140 has a function of irradiating the composition mounted on the mounting surface 110a with light.

The head 141 is a member attached to the third rail 124 and configured to be movable in parallel to the y direction along the third rail 124.

The light source 142 is a device that is attached to the head 141 and emits light having a wavelength that cures the photocurable resin composition contained in the composition of the embodiment described above. The power source 148 is connected to the light source 142 through the cable 149. As the light source 142, for example, a laser light source capable of irradiating ultraviolet rays can be preferably used.

The light emission direction from the light source 142 is set to the direction of the mounting surface 110a of the stage 110. The light source 142 can be moved in parallel to the y direction along the third rail 124 as the head 141 moves.

As shown in FIG. 2, in the production device 100, by controlling the operation of the third rail 124 that can be moved in parallel to the x direction, the head 141 that can be moved in parallel to the y direction, and the first rail 122 that can be moved in parallel to z direction, the light irradiation unit 140 can emit light along the pattern of the composition formed on the mounting surface 110a. Thus, it is possible to form a cured article having a shape of a pattern of the composition in the production device 100.

When the formation of the cured article using the light irradiation unit 140 is completed, the first rail 122 moves in the +z direction. The moving distance is, for example, about 25 μm. After the movement, a pattern of the composition is formed again as shown in FIG. 1.

As described above, the first molded article 1100 which is a laminate of a cured article is formed by alternately performing formation of the pattern of the composition and light irradiation to the surface of the pattern of the composition.

In a case where the first molded article 1100 is formed in this manner, when the composition flows between application of the composition and light irradiation, it is difficult to obtain a cured article having a desired shape. Therefore, in a case where the first molded article 1100 is formed by alternately repeating the step of forming the pattern of the composition and the step of forming the cured article as in the production device 100, the viscosity of the composition used is 500 mPa·s or more. The viscosity of the composition can be set to 5000 mPa·s or more.

Thus, the first molded article 1100 which has an arbitrary shape can be formed.

(Step of Forming Second Molded Article)

Figure 3:
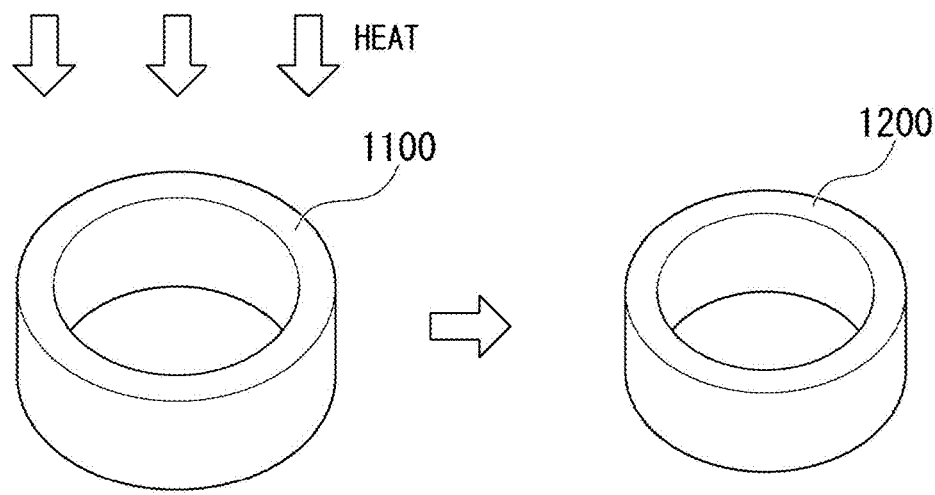
FIG. 3 is an explanatory view showing a step of forming a second molded article.

Next, as shown in FIG. 3, the first molded article 1100 is heated and fired to remove the photocurable resin contained in the first molded article 1100. The firing temperature can be higher than the decomposition temperature of the photocurable resin to be used and can be lower than the temperature at which the inorganic particles contained in the composition are sintered.

Firing when the photocurable resin contained in the first molded article 1100 is removed is performed, for example, by raising the temperature from room temperature to 200° C. at about 10° C./min, raising the temperature from 200° C. to 600° C. at 5° C./min, and raising the temperature from 600° C. to 800° C. at 10° C./min, and then maintaining the temperature at 800° C. for 30 minutes.

The lower the temperature rising rate during firing, the more preferable it is. When the temperature rising rate is lower, the obtained second molded article is hardly cracked.

From this viewpoint, in the firing when the photocurable resin included in the first molded article 1100 is removed, for example, the temperature may be raised from room temperature to 200° C. at about 5° C./min.

Similarly, in the firing, the temperature may be raised from 200° C. to 600° C. at 1° C./min.

Similarly, in the firing, the temperature may be raised from 600° C. to 800° C. at 5° C./min and then held at 800° C. for 30 minutes.

The above firing conditions are an example and can be appropriately changed according to the shape and size of the first molded article 1100, the kind of photocurable resin used, the content of the photocurable resin composition in the composition for inorganic molded article production use which is a raw material.

In the determination of the firing conditions, a preliminary experiment is performed in advance, and the temperature condition, the temperature rising rate condition, the holding time, and the like at which the photocurable resin is sufficiently removed can be set.

For example, the amount of organic matter contained in the first molded article 1100 can be estimated from the formulation of the used composition for inorganic molded article production use and the mass of the first molded article 1100. From the difference between the mass of the first molded article 1100 and the mass of the molded article after firing, the amount of organic matter removed by firing can be obtained. By comparing the estimated value of the organic matter contained in the first molded article 1100 with the amount of organic matter removed by firing, it can be confirmed that the photocurable resin is sufficiently removed.

The first molded article 1100 is fired in an oxygen containing atmosphere, for example, an air atmosphere.

The firing time can be set in advance by conducting a preliminary experiment for each kind of the composition used as a raw material.

By the above firing treatment, a second molded article 1200 having an arbitrary shape using inorganic particles as a forming material is formed. The shape of the second molded article 1200 is a shape reflecting the shape of the first molded article 1100.

As compared to the first molded article 1100, the second molded article 1200 shrinks as much as the photocurable resin is removed. In the embodiment, the content of the inorganic particles of the composition, which is a raw material, is 60% by mass or more with respect to the total amount of the photocurable resin composition and the inorganic particles. In addition, the content of the inorganic particles is 60% by mass or more with respect to the entire amount of the composition. Therefore, excessive shrinkage can be suppressed for the second molded article 1200 to be generated.

(Step of Sintering Second Molded Article)

Figure 4:
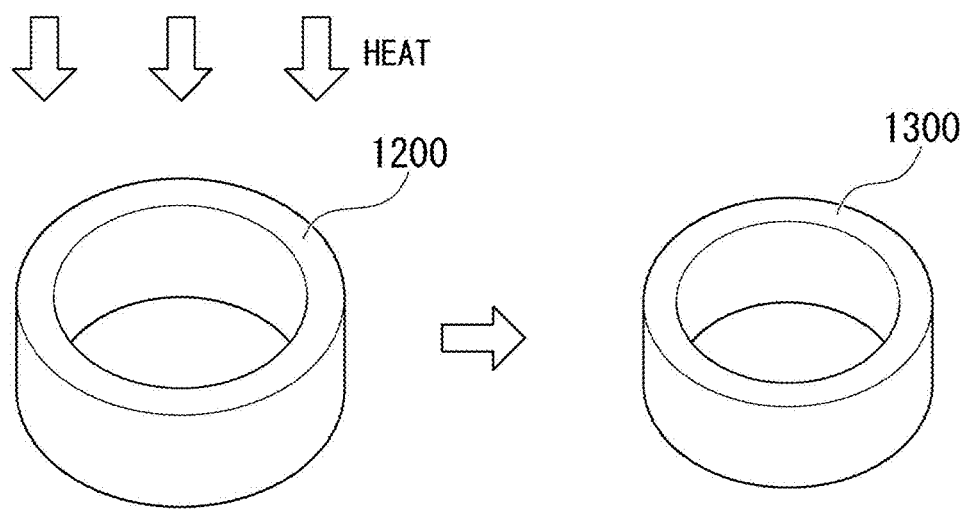
FIG. 4 is an explanatory view showing a step of sintering the second molded article.

Next, as shown in FIG. 4, the second molded article 1200 is heated, and the inorganic particles constituting the second molded article 1200 are sintered. Thus, the inorganic particles constituting the second molded article 1200 are sintered and aggregated and shrink to obtain an inorganic molded article 1300 which is a target product. The shape of the inorganic molded article 1300 is a shape reflecting the shape of the second molded article 1200.

The sintering temperature may be appropriately set according to the kind (forming material and average particle diameter) of inorganic particles constituting the second molded article 1200.

In addition, it is preferable to secure a sufficient time for the sintering time until the obtained inorganic molded article exhibits desired transparency.

The second molded article 1200 is sintered, for example, by raising the temperature from room temperature to 800° C. at about 10° C./min, raising the temperature from 800° C. to 1300° C. at 5° C./min, and maintaining the temperature at 1300° C. for 30 minutes. Thereafter, the temperature is raised from 1300° C. to 1600° C. at 10° C./min and then the molded article is allowed to cool to room temperature.

The above sintering conditions are an example and can be appropriately changed according to the shape and size of the second molded article 1200, the kind, shape, and content of inorganic particles constituting the composition for inorganic molded article production use which is a raw material, and the like.

In the determination of the sintering conditions, a preliminary experiment is performed in advance, and the temperature condition, the temperature rising rate condition, the holding time, and the like at which the second molded article 1200 is sufficiently sintered can be set.

For example, in a state in which the inside of the inorganic molded article 1300 is irradiated with light from the surface of the obtained inorganic molded article 1300, the inside of the inorganic molded article 1300 is observed using an optical microscope. At this time, in a case where the interface between the particles in the inorganic molded article 1300 cannot be confirmed, it can be determined that the second molded article 1200 is sufficiently sintered.

In addition, it is possible to confirm that the second molded article 1200 is sufficiently sintered by measuring the haze value (Hz value) in accordance with JIS K 7136 for the inorganic molded article 1300 having the same shape with different periods of sintering time.

When the sintering time is increased and the sintering advances, the amount of scattered light generated in the inorganic molded article 1300 decreases, and the haze value decreases. Therefore, when comparing the haze value of an inorganic molded article with a certain sintering time (T0) with the haze value of an inorganic molded article with a sintering time (T1, T1>T0) longer than the sintering time T0, for example, in a case where a difference between the two haze values is reduced to about ±1.0%, it can be determined that the molded article is sufficiently sintered at the sintering time T0.

Of course, the sintering time may be secured from the sintering time T0 at which it can be determined that the sintering is sufficiently performed by the above method.

The second molded article 1200 may be fired in an air atmosphere or an inert gas atmosphere and preferably in the inert gas (nitrogen, argon, helium) atmosphere. Further, at the time of firing under the condition of a temperature higher than 1400° C., vacuum firing is preferable.

In the above-described production method, for example, a cooling step of cooling the second molded article 1200 to room temperature can be sandwiched between the step of forming the second molded article and the step of sintering the second molded article. In a case where a defective product is included in the second molded article 1200, the defective product can be easily excluded by sandwiching the cooling step of the second molded article 1200, and the number of defective products in the inorganic molded article 1300, which is a target product, can be reduced.

In addition, in the above-described production method, after the step of forming the second molded article, the step of sintering the second molded article can be performed by raising the temperature from the temperature at which the second molded article is formed without cooling the sintering temperature of the second molded article. In this case, since the process from the step of forming the second molded article to the step of sintering the second molded article is a continuous treatment, the total time required for molding the inorganic molded article 1300 can be shortened.

The inorganic particles that are the raw material of the inorganic molded article 1300 are transparent because the inorganic particles are amorphous. In addition, since the inorganic particles, which are a raw material, are amorphous in the inorganic molded article 1300, it is difficult to form grain boundaries in the sintered body.

In a case where the inorganic particles are spherical, the filling density of the inorganic particles increases in the first molded article 1100 and the second molded article 1200 in the middle of the molding of the inorganic molded article. Therefore, it is difficult for bubbles to be included in the molded article, and voids are not easily formed even during sintering. These bubbles and voids can be a visible light scattering source, which can reduce the light transmittance of the inorganic molded article.

As a result, the inorganic molded article 1300 obtained by sintering becomes a "transparent member" having transparency.

In a case where the inorganic particles contained in the raw material composition are spherical, a structure in which the inorganic particles are densely filled is easily formed in the second molded article 1200 before sintering. As a result, in a case where the inorganic particles are spherical, vacancies are not easily formed in the inorganic molded article 1300 obtained by sintering. Therefore, the obtained inorganic molded article 1300 can have high transparency.

According to the composition having the above-described constitution, the composition can be suitably used as a raw material for the transparent member using the inorganic material as a forming material and can easily form a transparent member having a desired shape.

In addition, according to the method for producing the inorganic molded article having the above-described constitution, a transparent member having a desired shape using the inorganic material as a forming material can be easily formed.

In the embodiment, as an example of the step of forming the first molded article, the method using the production device 100 is shown, but the present invention is not limited thereto. The first molded article can also be formed by the following method.

(Step (2) of Forming First Molded Article)

Figure 5:
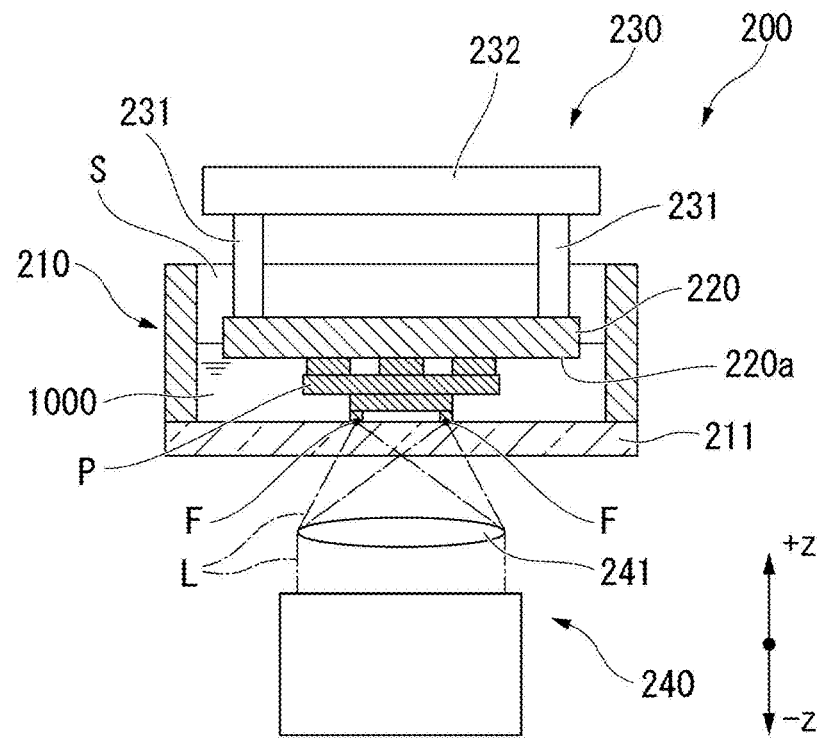
FIG. 5 is an explanatory view showing another example of the step of forming the first molded article.
Figure 6:
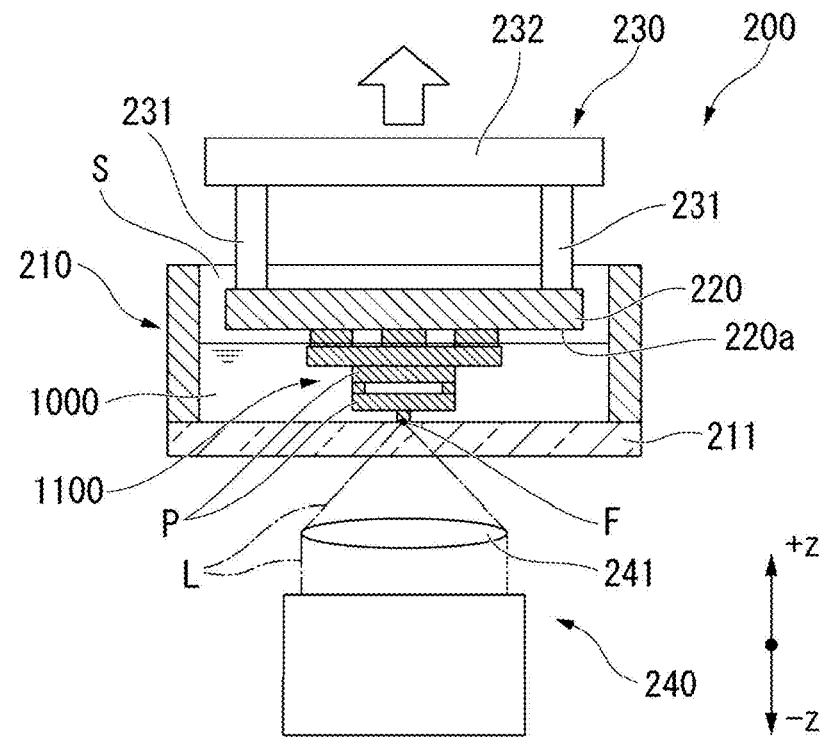
FIG. 6 is an explanatory view showing another example of the step of forming the first molded article.

FIGS. 5 and 6 are explanatory views showing other examples of the step of forming the first molded article in the method for producing an inorganic molded article according to the embodiment.

As shown in FIGS. 5 and 6, method for producing an inorganic molded article according to the embodiment, the first molded article 1100 can be molded using a production device 200.

The production device 200 has a storage tank 210, a stage 220, a driving unit 230, and a light irradiation unit 240. The production device 200 is a 3D printer device adopting a so-called regulated liquid level system (or limited liquid level system).

In addition, in the description of FIGS. 5 and 6, the +z direction shown in FIGS. 5 and 6 may be expressed as "up" and the −z direction may be expressed as "down".

The storage tank 210 is a container that stores a liquid composition 1000. The storage tank 210 has an internal space S that opens upward and stores the liquid composition 1000. The bottom portion of the storage tank 210 is a light transmission portion 211 having transparency with respect to light for curing the composition 1000. As a forming material for the light transmission portion 211, various materials can be used as long as the materials are transparent to light.

The stage 220 is a plate-like member disposed in the internal space S of the storage tank 210. The stage 220 holds the first molded article 1100 formed on a lower surface 220a of the stage 220.

The driving unit 230 has a function of moving the stage 220 up and down. The driving unit 230 includes a holding section 231 that holds the stage 220 from above, and a base 232 that is connected to the holding section 231 and moves up and down. In the production device 200, the stage 220 moves up and down as the driving unit 230 moves.

The light irradiation unit 240 emits light that cures the composition 1000. For the light irradiation unit 240, for example, a projector that emits image light L using light can be used. The image light L is formed based on image data using slice data of the first molded article 1100 to be formed as image data.

The projector that is the light irradiation unit 240 may be a liquid crystal projector, a projector using a digital micromirror device (DMD), or a scanning type laser projector.

In such a production device 200, as shown in FIG. 5, the image light L formed by a main body 241 of the light irradiation unit 240 is projected through a condensing optical system 242. The image light L forms an image on the composition 1000 through the light transmission portion 211. At an image formation position F of the image light L, the composition 1000 is selectively irradiated with the image light L, and the composition 1000 is cured according to the formed image. Thus, a pattern (cured pattern P) of the cured article is formed.

Next, as shown in FIG. 6, in the production device 200, the driving unit 230 moves the stage 220 in parallel to the +z direction. The moving distance is, for example, about 25 μm. Thus, the composition 1000 is supplied to the surface of the cured pattern P formed by irradiation with the image light L.

Next, the composition 1000 is irradiated again with the image light L from the light irradiation unit 240 to form a cured pattern P corresponding to the image formed by the image light L.

Thus, the first molded article 1100 which is the laminate of the cured pattern P can be formed by performing formation of the cured pattern P and supply of the composition 1000 to the surface of the cured pattern P alternately.

In a case where the first molded article 1100 is formed ad described above, when the stage 220 is moved after the cured pattern P is formed, the composition 1000 is required to flow into a gap between the cured pattern P and the light transmission portion 211. In addition, when the stage 220 is moved, the composition 1000 is required to suitably flow so as to cover the surface of the cured pattern P.

Therefore, in a case where the first molded article 1100 is formed by repeating the step of forming the pattern of the cured article and the step of supplying the composition as in the production device 200, the viscosity of the composition 1000 to be sued is set to less than 5000 mPa·s. The viscosity of the composition can be set to less than 2000 mPa·s.

The formed first molded article can be formed into an inorganic molded article having a desired shape through firing and sintering as described using FIGS. 3 and 4.

Further, even in the method for producing an inorganic molded article having the above constitution, a transparent member having a desired shape can be formed using the inorganic material as a forming material.

The preferred embodiments according to the present invention have been described above with reference to the accompanying drawings, but needless to say, the present invention is not limited to such examples. Various shapes and combinations of the constituent members shown in the above-described examples are merely examples, and various modifications can be made based on design requirements and the like without departing from the gist of the present invention.

For example, in the production device 200 described above, the bottom portion of the storage tank 210 is the light transmission portion 211, and the image light L is emitted from the lower side of the storage tank 210 through the light transmission portion 211. However, the present invention is not limited thereto.

The image light L can be emitted from the upper side of the storage tank 210 toward the composition 1000, and the cured article cured on the liquid surface of the composition 1000 can be held on the upper surface of the stage 220. In this case, the stage 220 can be lowered in the −z direction as the mold progresses.

EXAMPLES

[Level 1]

Example 1

(a) Isobornyl acrylate, (b) tetrahydrofurfuryl acrylate, and (c) diethylene glycol monoethyl ether acrylate were mixed at a mass ratio shown in Table 1 to obtain a mixed solution.

Further, a photopolymerization initiator (product name: IRGACURE TPO, Diphenyl(2,4,6-trimethylbenzoyl)phosphine Oxide), manufactured by BASF) was mixed with the mixed solution so that the mixed solution: photopolymerization initiator=98:2 (mass ratio).

On the other hand, silica particles with a surface were modified by mixing a silane coupling agent (3-methacryloxypropyltrimethoxysilane) and spherical silica particles with a surface not modified with a silane coupling agent (average primary particle diameter: 1 μm) were obtained. The silane coupling agent was used in an amount of 1% by mass with respect to the silica particles.

Next, the silica particles with a surface modified with the silane coupling agent, silica nanoparticles with a surface not modified with the silane coupling agent (average primary particle diameter: 10 nm), and the mixed solution were mixed to obtain a composition of Example 1. The composition of Example 1 contained 60% by mass of the silica particles with respect to the total amount of the silica particles and the mixed solution. In addition, the composition of Example 1 contained 60% by mass of the silica particles with respect to the entire amount of the composition.

Examples 2 to 8

Compositions of Examples 2 to 8 were obtained in the same manner as in Example 1 except that the mixing ratio of (a) isobornyl acrylate, (b) tetrahydrofurfuryl acrylate, and (c) diethylene glycol monoethyl ether acrylate, and the mixing ratio of the surface-modified silica particles, the silica nanoparticles, and the mixed solution were changed to the mass ratios as shown in Table 1.

Comparative Examples 1 to 4

Compositions of Comparative Examples 1 to 4 were obtained in the same manner as in Example 1 except that the mixing ratio of (a) isobornyl acrylate, (b) tetrahydrofurfuryl acrylate, and (c) diethylene glycol monoethyl ether acrylate, and the mixing ratio of the surface-modified silica particles, the silica particles before surface modification, the silica nanoparticles, and the mixed solution were changed to the mass ratios as shown in Table 2.

(Molding of Inorganic Molded Article)

The obtained compositions of Examples 1 to 5 and Comparative Examples 1 to 4 were used to prepare the first molded articles in the above-described embodiment using a 3D printer device (model: ML-48, manufactured by MUTOH INDUSTRIES LTD.) based on the principle shown in FIGS. 5 and 6. In the 3D printer device, the light source wavelength was 405 nm, the exposure time per layer lamination was 10 seconds, and the lamination pitch was 25 μm or 100 μm. The first molded article had a rectangular plate shape or a disk shape in plan view.

The first molded article was heated to 900° C. in the atmosphere at a temperature rising rate of 1° C./min to prepare the second molded article in the above-described embodiment.

The obtained second molded article was fired at 1600° C. in a vacuum atmosphere to obtain an inorganic molded article.

(Evaluation)
(Fluidity of Composition)

The fluidity of the composition was evaluated using a viscometer (SV-10, manufactured by A&D Co. Ltd.) at a measurement temperature of 30° C. In each example of Level 1, a composition having a viscosity of 5000 mPa·s or less suitable for the 3D printer device shown in FIGS. 5 and 6 was determined as a good product.

(Transparency of Inorganic Molded Article)

The transparency of the inorganic molded article was measured using an ultraviolet-visible spectrophotometer (U-4000, manufactured by Hitachi, Ltd.). The test piece (inorganic molded article) used for the measurement was prepared using the compositions of Examples and Comparative Examples. The thickness of the test piece was 1 mm. The obtained measured values were evaluated based on the following standards.

A: Light transmittance of 80% or more
B: Light transmittance 70% or more and less than 80%

The evaluation results for the compositions of Examples 1 to 8 and Comparative Examples 1 to 4 are shown in Tables 1 and 2.

TABLE 1

|  |  | Example 1 | Example 2 | Example 3 | Example 4 | Example 5 | Example 6 | Example 7 | Example 8 |
|---|---|---|---|---|---|---|---|---|---|
| Mass Fraction (% by mass) | (A)* | 50 | 46 | 44 | 75 | 80 | 60 | 60 | 60 |
|  | (B)* | 10 | 14 | 16 | — | — | — | — | — |
|  | (C)* | — | — | — | — | — | — | — | — |
|  | (a)* | 25 | 30 | 23 | 15 | 11.8 | 25 | 30 | 23 |
|  | (b)* | — | 10 | 4 | 2 | 1.8 | — | 10 | 4 |
|  | (c)* | 15 | — | 13 | 8 | 6.4 | 15 | — | 13 |
| Viscosity of composition (mPa · s) |  | 2010 | 2550 | 4850 | 330 | 550 | 215 | 225 | 235 |
| Transparency of inorganic molded article |  | B | B | B | A | A | B | B | B |

*(A) Silica particle (surface modified)
*(B) Silica nanoparticle (non-surface modified)
*(C) Silica particle (non-surface modified)
*(a) Isobornyl acrylate
*(b) Tetrahydrofurfuryl acrylate
*(c) Diethylene glycol monoethyl ether acrylate

TABLE 2

|  |  | Comparative Example 1 | Comparative Example 2 | Comparative Example 3 | Comparative Example 4 |
|---|---|---|---|---|---|
| Mass fraction (% by mass) | Silica particle (surface modified) | — | — | — | 30 |
|  | Silica nanoparticle (non-surface modified) | — | — | — | 30 |
|  | Silica particle (non-surface modified) | 40 | 60 | 20 | — |
|  | (a)* | 35 | 23 | 45 | 23 |
|  | (b)* | 5 | 4 | 10 | 14 |
|  | (c)* | 20 | 13 | 25 | 13 |
| Viscosity of composition (mPa · s) |  | 6780 | Unmeasurable | 395 | Unmeasurable |
| Transparency of inorganic molded article |  | Unmoldable | Unmoldable | Unmoldable | Unmoldable |

*(a) Isobornyl acrylate
(b) Tetrahydrofurfuryl acrylate
(c) Diethylene glycol monoethyl ether acrylate As a result of the evaluation, the compositions of Examples 1 to 8 had a viscosity of 5000 mPa·s and excellent fluidity even though the content of the inorganic particles was 60% by mass or more. In addition, it was found that the inorganic molded articles molded using the compositions of Examples 1 to 8 exhibited high transparency.

Figure 7:
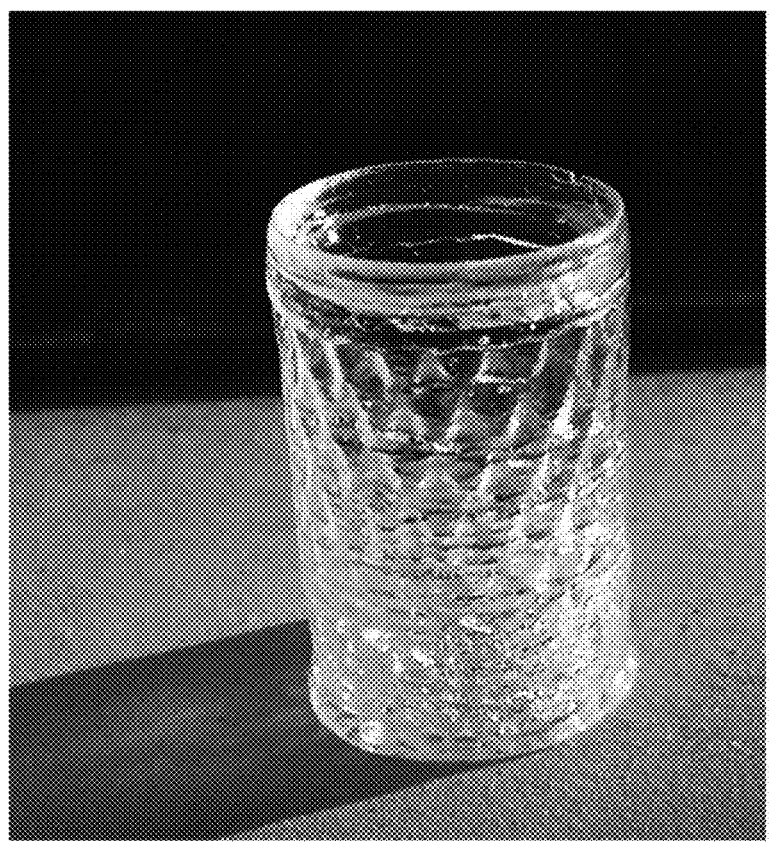
FIG. 7 is a view showing a result of an example.

Further, when the compositions of Examples 1 to 8 were used, for example, a highly designable container having a design in which the surface and the inside of the container were undulated as shown in FIG. 7 could be produced. The produced container had a diameter of 30 mm and a height of 50 mm. That is, it was confirmed that an inorganic molded article having a complicated shape could be produced by using the composition of the embodiment.

The size of the container shown in FIG. 7 is restricted by the maximum modeling size of the 3D printer device used in production and the capacity of the electric furnace used in production. By forming and sintering the second molded article using a 3D printer device capable of producing a large size and a large capacity furnace, as compared to the inorganic molded article shown in FIG. 7, it is considered that a large inorganic molded article can be produced.

In addition, when an inorganic molded article was molded using the composition of Example 5, the linear shrinkage ratio calculated based on the following formula from the dimension of the second molded article and the dimension of the inorganic molded article was 11%.

(Linear shrinkage ratio)=([Dimension of second molded article]−[Dimension of inorganic molded article])/[Dimension of second molded article]×100

On the other hand, the composition of Comparative Example 1 had a viscosity of more than 5000 mPa·s and low fluidity even though the content of the inorganic particles was as low as 40% by mass. In addition, when an inorganic molded article was molded using the composition of Comparative Example 1, after light irradiation, in the process in which the first molded article was heated and the second molded article was produced, the molded article was cracked and an inorganic molded article was not obtained.

In addition, the viscosity of the composition of Comparative Example 2 in which the content of the inorganic particles was 60% by mass was so high that the viscosity could not be measured, and an inorganic molded article could not be molded using the 3D printer device.

In addition, the composition of Comparative Example 3 in which the content of the inorganic particles was 20% by mass had excellent fluidity, and a second molded article could be molded by molding the first molded article using a 3D printer device, and firing the obtained first molded article. However, when the second molded article was sintered, the molded article was broken, and the intended inorganic molded article could not be obtained.

The first molded article containing the resin is considered to have voids in the portion where the resin is present when the resin is removed during firing to form the second molded article. In addition, when the second molded article is sintered, it is considered to form an inorganic molded article while shrinking so as to fill the voids. Since the first molded article molded using the composition of Comparative Example 3 contains a large amount of resin, it is considered that the shrinkage ratio during sintering to obtain an inorganic molded article is large, the strain accompanying shrinkage is large, and as a result, the molded article is broken.

In addition, the viscosity of the composition of Comparative Example 4 in which the content of the silica nanoparticles was 30% by mass was so high that the viscosity could not be measured even though the amount of the inorganic particles, that is, the total amount of the silica particles and the silica nanoparticles was the same as in Examples 1 to 3. The viscosity of the composition could not be controlled by using the silica nanoparticles, but it was confirmed that the viscosity was excessively increased when the silica nanoparticles were added too much.

From the above, it was confirmed that the composition in which the dispersion state of the silica particles was improved by modifying the surface of the silica particles with a silane coupling agent was obtained. It is considered that the composition having excellent fluidity is obtained by suppressing an increase in the viscosity of the composition by favorably dispersing the inorganic particles in the composition.

Moreover, it was confirmed that by adding the silica nanoparticles to the silica particles to be used, the dispersion state of the silica particles could be prepared and the viscosity of the composition could be controlled.

[Level 2]

Example 9

(b) Tetrahydrofurfuryl acrylate, (c) diethylene glycol monoethyl ether acrylate, and (d) 2-hydroxyethyl acrylate were mixed at a mass ratio shown in Table 3 to obtain a mixed solution.

Further, a photopolymerization initiator (product name: IRGACURE TPO, Diphenyl(2,4,6-trimethylbenzoyl)phosphine Oxide, manufactured by BASF) was mixed with the mixed solution at a mixed ratio of mixed solution:photopolymerization initiator=98:2 (mass ratio).

Next, the composition of Example 6 was obtained by mixing spherical silica particles (average primary particle diameter: 1 μm) whose surface was modified with a silane coupling agent and the above mixed solution. The composition of Example 6 contained 60% by mass of silica particles with respect to the total amount of the silica particles and the mixed solution.

Examples 10 to 13 and Comparative Example 5

Compositions of Examples 10 to 13 and Comparative Example 5 were obtained in the same manner as in Example 9 except that the mixing ratio of (a) isobornyl acrylate, (b) tetrahydrofurfuryl acrylate, (c) diethylene glycol monoethyl ether acrylate, and (d) 2-hydroxyethyl acrylate, and the mixing ratio of silica particles and mixed solution were changed to the mass ratios shown in Tables 3 and 4.

The fluidity of the compositions of Examples 9 to 13 and Comparative Examples 1 to 3 and 5 was evaluated by the method described above. The evaluation results are shown in Tables 3 and 4. For Comparative Examples 1 to 3, the same results as shown in Level 1 are shown.

As for the SP value (unit: $MPa^{1/2}$) of the silica particles, a known literature value (Powder Technology, 192 (2009) p. 92-98) was used.

The following values calculated using the Fedors' estimation method were adopted for the SP values (unit: $MPa^{1/2}$) of each of the monomers (a) to (d). As the SP value of the photocurable resin composition, a value obtained by adding the SP values of the respective monomers by the mass ratio was adopted.

(SP Value)
Silica particles: 25
(a) Isobornyl acrylate: 19.7
(b) Tetrahydrofurfuryl acrylate: 20.5
(c) Diethylene glycol monoethyl ether acrylate: 18.6
(d) 2-hydroxyethyl acrylate: 23.6

TABLE 3

|  |  | Example 9 | Example 10 | Example 11 | Example 12 | Example 13 |
|---|---|---|---|---|---|---|
| Mass fraction (% by mass) | Silica particle (non-surface modified) | 60 | 60 | 60 | 75 | 80 |
|  | (a)* | — | — | — | — | — |
|  | (b)* | — | 10 | 4 | 2 | 1.8 |
|  | (c)* | 15 | — | 13 | 8 | 6.4 |
|  | (d)* | 25 | 30 | 23 | 15 | 11.8 |
| SP value of photocurable resin composition ($MPa^{1/2}$) |  | 21.7 | 22.8 | 21.7 | 21.8 | 21.7 |
| Absolute value of difference with SP value of silica particle ($MPa^{1/2}$) |  | 3.3 | 2.2 | 3.3 | 3.2 | 3.3 |
| Viscosity of composition (mPa · s) |  | 180 | 180 | 185 | 200 | 220 |
| Transparency of inorganic molded article |  | B | B | B | A | A |

*(a) Isobornyl acrylate
*(b) Tetrahydrofurfuryl acrylate
*(c) Diethylene glycol monoethyl ether acrylate
*(d) 2-hydroxyethyl acrylate

TABLE 4

|  |  | Comparative Example 1 | Comparative Example 2 | Comparative Example 3 | Comparative Example 5 |
|---|---|---|---|---|---|
| Mass fraction (% by mass) | Silica particle (non-surface modified) | 40 | 60 | 20 | 20 |
|  | (a)* | 35 | 23 | 45 | — |
|  | (b)* | 5 | 4 | 10 | 20 |
|  | (c)* | 20 | 13 | 25 | 20 |
|  | (d)* | — | — | — | 40 |
| SP value of photocurable resin composition ($MPa^{1/2}$) |  | 19.4 | 19.4 | 19.5 | 21.6 |
| Absolute value of difference with SP value of silica particle ($MPa^{1/2}$) |  | 5.6 | 5.6 | 5.5 | 3.4 |

TABLE 4-continued

|  | Comparative Example 1 | Comparative Example 2 | Comparative Example 3 | Comparative Example 5 |
|---|---|---|---|---|
| Viscosity of composition (mPa · s) | 6780 | Unmeasurable | 395 | 40 |
| Transparency of inorganic molded article | Unmoldable | Unmoldable | Unmoldable | Unmoldable |

*(a) Isobornyl acrylate
(b) Tetrahydrofurfuryl acrylate
(c) Diethylene glycol monoethyl ether acrylate
(d) 2-hydroxyethyl acrylate As a result of the evaluation, the compositions of Examples 9 to 13 had a viscosity of 5000 mPa·s and excellent fluidity even though the content of the inorganic particles was 60% by mass or more. In addition, it was found that the inorganic molded articles molded using the composition of Examples 9 to 13 exhibited high transparency.

On the other hand, in the compositions of Comparative Examples 1 and 2, the content of the inorganic particles was 60% by mass or less, even though the content was equal to or less than the content in Examples 9 to 13, the viscosity was more than 5000 mPa·s, and the fluidity was low.

In addition, the composition of Comparative Example 5 in which the content of the inorganic particles was 20% by mass had excellent fluidity, and a second molded article could be molded by molding the first molded article using a 3D printer device, and firing the obtained first molded article. However, when the second molded article was sintered, the molded article was broken, and the intended inorganic molded article could not be obtained.

On the other hand, the viscosity of the composition of Comparative Example 1 was so high that the viscosity could not be measured even though the content of the inorganic particles was as low as 40% by mass.

Further, the viscosity of the composition of Comparative Example 2 in which the content of the inorganic particles was 60% by mass was so high that the viscosity could not be measured.

In addition, in the compositions of Comparative Examples 3 and 5 in which the content of the inorganic particles was 20% by mass had excellent fluidity, a second molded article could be molded by molding the first molded article using a 3D printer device, and firing the obtained first molded article. However, when the second molded article was sintered, the molded article was broken, and the intended inorganic molded article could not be obtained.

In addition, in the comparison between Comparative Example 3 and Comparative Example 5, it was also confirmed that by adding silica nanoparticles to the silica particles to be used, the dispersion state of the silica particles could be prepared and the viscosity of the composition could be controlled.

From the above, it was confirmed that the composition in which the dispersion state of the silica particles was a good by adjusting the composition of the photocurable resin composition so as to decrease a difference between the solubility parameter of the inorganic particles (silica particles) and the solubility parameter of the photocurable resin composition without modifying the surface of the silica particles with a silane coupling agent was obtained. It is considered that the composition having excellent fluidity is obtained by suppressing an increase in the viscosity of the composition by favorably dispersing the inorganic particles in the composition.

[Level 3]

Example 14

A composition of Example 14 was obtained in the same manner as in Example 1 except that the mixing ratio of (a) isobornyl acrylate, (b) tetrahydrofurfuryl acrylate, and (c) diethylene glycol monoethyl ether acrylate, and the mixing ratio of the surface-modified silica particles, the silica nanoparticles, and the mixed solution were changed to the mass ratios shown in Table 5.

TABLE 5

|  |  | Example 14 |
|---|---|---|
| Mass fraction (% by mass) | Silica particle (surface modified) | 38 |
|  | Silica nanoparticle (non-surface modified) | 22 |
|  | Silica particle (non-surface modified) | — |
|  | (a)* | 23 |
|  | (b)* | 4 |
|  | (c)* | 13 |
| Viscosity of composition (mPa · s) |  | 9720 |

*(a) Isobornyl acrylate
(b) Tetrahydrofurfuryl acrylate
(c) Diethylene glycol monoethyl ether acrylate (Molding of Inorganic Molded Article)

The first molded article in the above-described embodiment was produced was prepared with the obtained composition of Example 14 using a stereolithography device based on the principle shown in FIG. 1 (SHOTmini 200 Sx, manufactured by Musashi Engineering, Inc.), a dispenser (ML-808GX, manufactured by Musashi Engineering, Inc.), and an ultraviolet irradiation light source (wavelength: 405 nm).

The obtained first molded article was fired and heated for sintering in the same manner as in Example 1 to obtain an inorganic molded article.

The obtained inorganic molded article was confirmed to have high light transmittance.

From the above results, it was found that the present invention is useful.

REFERENCE SIGNS LIST

1000 Composition
1100 First molded article
1200 Second molded article
1300 Inorganic molded article

What is claimed is:

1. A resin composition for inorganic molded article production use comprising:
   inorganic particles containing amorphous $SiO_2$; and
   a photocurable resin composition,
   wherein the photocurable resin composition includes a photocurable resin precursor, and a photopolymerization initiator,
   a content of the inorganic particles is 60% by mass or more with respect to a total amount of the photocurable resin composition and the inorganic particles and is 60% by mass or more with respect to an entire amount of the resin composition for inorganic molded article production use,
   a viscosity is 10000 mPa·s or less,
   wherein the inorganic particle includes a particle main body having an amorphous inorganic material as a main component,
   a surface treatment layer covering at least a part of a surface of the particle main body,
   wherein the inorganic particle includes a particle main body including a first amorphous inorganic material and a second crystalline inorganic material, and
   a surface treatment layer covering at least a part of a surface of the particle main body,
   the first amorphous inorganic material consists of amorphous $SiO_2$,
   the second crystalline inorganic material consists of silicon compounds, and
   the second inorganic material has a crystallite diameter of 50 nm or less.

2. The composition for inorganic molded article production use according to claim 1,
   wherein the surface treatment layer is formed using a silane coupling agent as a forming material.

3. The composition for inorganic molded article production use according to claim 1,
   wherein the inorganic particle contains amorphous $SiO_2$ as a main component, and
   an absolute value of a difference between a solubility parameter of the photocurable resin composition and a solubility parameter of the inorganic particle is 4 or less.

4. The composition for inorganic molded article production use according to claim 1,
   wherein the inorganic particle includes a first inorganic material which is amorphous $SiO_2$, and a second crystalline inorganic material,
   the first amorphous inorganic material consists of amorphous $SiO_2$,
   the second crystalline inorganic material consists of silicon compounds,
   the second inorganic material has a crystallite diameter of 50 nm or less, and
   an absolute value of a difference between a solubility parameter of the photocurable resin composition and a solubility parameter of the inorganic particles is 4 or less.

5. The composition for inorganic molded article production use according to claim 1,
   wherein the inorganic particle is spherical.

6. The composition for inorganic molded article production use according to claim 1,
   wherein the inorganic particles contain either or both $TiO_2$ and $Al_2O_3$ as a forming material.

7. The composition for inorganic molded article production use according to claim 1,
   wherein the photocurable resin precursor is an acrylic monomer.

8. The composition for inorganic molded article production use according to claim 1, further comprising:
   a dispersion medium.

9. The composition for inorganic molded article production use according to claim 8,
   wherein the dispersion medium is an organic solvent.

10. A method for producing an inorganic molded article comprising:
    a step of forming a first molded article including inorganic particles and a photocurable resin by irradiating the composition for inorganic molded article production use according to claim 1 with light;
    a step of forming a second molded article using the inorganic particles as a forming material by firing the first molded article and removing the photocurable resin; and
    a step of sintering the second molded article.

11. The method for producing an inorganic molded article according to claim 10,
    wherein a viscosity of the composition for inorganic molded article production use is 5000 mPa·s or more and 10000 mPa·s or less,
    the step of forming the first molded article includes a step of forming a pattern of the composition for inorganic molded article production use by selectively applying the composition for inorganic molded article production use, and
    a step of forming a cured article having a shape of the pattern by irradiating the pattern of the composition for inorganic molded article production use with the light, and
    the first molded article is formed as a laminate of the cured article by alternately performing the step of forming the pattern and the step of forming the cured article.

12. The method for producing an inorganic molded article according to claim 10,
    wherein a viscosity of the composition for inorganic molded article production use is less than 5000 mPa·s,
    the step of forming the first molded article includes a step of forming a pattern of a cured article of the composition for inorganic molded article production use by selectively irradiating the composition for inorganic molded article production use with the light, and
    a step of supplying the composition for inorganic molded article production use to a surface of the pattern of the cured article, and
    the first molded article is Ruined as a laminate of the cured article by alternately performing the step of forming the pattern and the step of supplying the composition for inorganic molded article production use.

* * * * *